US012433799B2

(12) United States Patent
Andrews et al.

(10) Patent No.: US 12,433,799 B2
(45) Date of Patent: Oct. 7, 2025

(54) METHOD OF MAKING ELASTICIZED WAISTBAND FOR USE IN AN ABSORBENT GARMENT

(71) Applicant: Curt G. Joa, Inc., Sheboygan Falls, WI (US)

(72) Inventors: Robert E. Andrews, Falmouth, ME (US); Christopher A. Schwartz, Howards Grove, WI (US)

(73) Assignee: Curt G. Joa, Inc., Sheboygan Falls, WI (US)

( * ) Notice: Subject to any disclaimer, the term of this patent is extended or adjusted under 35 U.S.C. 154(b) by 546 days.

(21) Appl. No.: 17/794,602

(22) PCT Filed: Jan. 25, 2021

(86) PCT No.: PCT/US2021/070077
§ 371 (c)(1),
(2) Date: Jul. 21, 2022

(87) PCT Pub. No.: WO2021/155396
PCT Pub. Date: Aug. 5, 2021

(65) Prior Publication Data
US 2023/0143833 A1    May 11, 2023

Related U.S. Application Data

(60) Provisional application No. 62/966,112, filed on Jan. 27, 2020.

(51) Int. Cl.
*A61F 13/15* (2006.01)
*A61F 13/49* (2006.01)
*A61F 13/496* (2006.01)

(52) U.S. Cl.
CPC .. *A61F 13/15756* (2013.01); *A61F 13/15723* (2013.01); *A61F 13/15747* (2013.01);
(Continued)

(58) Field of Classification Search
None
See application file for complete search history.

(56) References Cited

U.S. PATENT DOCUMENTS

| 4,555,244 A | 11/1985 | Buell |
| 5,374,262 A | 12/1994 | Keuhn et al. |

(Continued)

FOREIGN PATENT DOCUMENTS

| WO | 00/37007 | 6/2000 |

OTHER PUBLICATIONS

International Search Report and Written Opinion for PCT Application No. PCT/US2021 /070077 dated Jul. 15, 2021, 19 pages.

*Primary Examiner* — Barbara J Musser
(74) *Attorney, Agent, or Firm* — Klintworth & Rozenblat LLP

(57) ABSTRACT

Absorbent garments are made by applying a refastenable material to a continuous panel web, folding the panel web, cutting the folded panel web into discrete folded panels, and aligning the folded panels with perforations in a continuous elasticized waist web. Discrete folded patches are coupled to the elastic web via the refastenable material and the perforation cuts are broken to form a continuous waistband. Absorbent cores are coupled between the continuous waistband and a second continuous waistband, which are cut to form the absorbent garments. The manufacturing apparatus includes a perforation cutter that forms perforation cuts in a continuous waist web comprising elastic elements positioned between facing web layers, a panel applicator that cuts a folded panel web into discrete panels and attaches the discrete panels to the waist web about the perforation cut. A breakage system separates the waist web at the perforation cuts and unfolds the discrete panels.

4 Claims, 15 Drawing Sheets

(52) U.S. Cl.
CPC .. *A61F 13/15764* (2013.01); *A61F 13/15804* (2013.01); *A61F 13/49012* (2013.01); *A61F 13/49015* (2013.01); *A61F 13/496* (2013.01)

(56) References Cited

U.S. PATENT DOCUMENTS

| | | | |
|---|---|---|---|
| 5,476,702 A | 12/1995 | Datta et al. | |
| 5,624,428 A | 4/1997 | Sauer | |
| 6,113,717 A | 9/2000 | Vogt et al. | |
| 6,328,725 B2 | 12/2001 | Fernfors | |
| 6,352,528 B1 | 3/2002 | Weber et al. | |
| 6,409,858 B1 | 6/2002 | Popp et al. | |
| 6,432,243 B1 | 8/2002 | Popp et al. | |
| 6,432,248 B1 | 8/2002 | Popp et al. | |
| 6,450,996 B1 | 9/2002 | Otsubo | |
| 6,454,752 B1 | 9/2002 | Huang et al. | |
| 6,497,695 B1 | 12/2002 | Bruemmer-Prestley et al. | |
| 6,497,696 B1 | 12/2002 | Freiburger et al. | |
| 6,503,239 B1 | 1/2003 | Bruemmer-Prestley et al. | |
| 6,508,797 B1 | 1/2003 | Pozniak et al. | |
| 6,569,141 B1 | 5/2003 | Bruemmer-Prestley et al. | |
| 6,575,949 B1 | 6/2003 | Waksmundzki et al. | |
| 6,575,950 B1 | 6/2003 | Waksmundzki et al. | |
| 6,579,275 B1 | 6/2003 | Pozniak et al. | |
| 6,635,135 B2 | 10/2003 | Kuen et al. | |
| 6,645,188 B2 | 11/2003 | Kusibojoska et al. | |
| 6,682,626 B2 | 1/2004 | Mlinar et al. | |
| 6,702,801 B2 | 3/2004 | Gompel et al. | |
| 6,712,922 B2 | 3/2004 | Sorenson et al. | |
| 6,723,034 B2 | 4/2004 | Durrance et al. | |
| 6,733,484 B2 | 5/2004 | Gompel et al. | |
| 6,743,321 B2 | 6/2004 | Guralski et al. | |
| 6,817,994 B2 | 11/2004 | Popp et al. | |
| 6,849,067 B2 | 2/2005 | Fletcher et al. | |
| 6,872,267 B2 | 3/2005 | Popp et al. | |
| 6,878,223 B2 | 4/2005 | Kuen et al. | |
| 6,905,488 B2 | 6/2005 | Olson | |
| 6,976,521 B2 | 12/2005 | Mlinar et al. | |
| 6,991,696 B2 | 1/2006 | Wagner et al. | |
| 7,101,360 B2 | 9/2006 | Sorenson et al. | |
| 7,166,096 B2 | 1/2007 | Kawata et al. | |
| 7,185,401 B2 | 3/2007 | Ausen et al. | |
| 7,229,515 B2 | 6/2007 | Couillard et al. | |
| 7,326,191 B2 | 2/2008 | Bianco | |
| 7,344,523 B2 | 3/2008 | Van Gompel et al. | |
| 7,371,302 B2 | 5/2008 | Miyamoto et al. | |
| 7,393,429 B2 | 7/2008 | Tachibana | |
| 7,425,242 B2 | 9/2008 | Olsson et al. | |
| 7,431,791 B2 | 10/2008 | Heller et al. | |
| 7,455,665 B2 | 11/2008 | Wendelstorf et al. | |
| 7,534,237 B2 | 5/2009 | Olson et al. | |
| 7,617,656 B2 | 11/2009 | Wiedmann | |
| 7,621,901 B2 | 11/2009 | Karami | |
| 7,740,732 B2 | 6/2010 | Umebayashi et al. | |
| 7,744,577 B2 | 6/2010 | Otsubo et al. | |
| 7,766,889 B2 | 8/2010 | Erdman | |
| 7,806,880 B2 | 10/2010 | Roe et al. | |
| 7,820,003 B2 | 10/2010 | Tachibana et al. | |
| 7,833,207 B2 | 11/2010 | Kenmochi et al. | |
| 8,007,622 B2 | 8/2011 | Heller et al. | |
| 8,070,738 B2 | 12/2011 | Ashton et al. | |
| 8,114,058 B2 | 2/2012 | Otsubo et al. | |
| 8,430,857 B2 | 4/2013 | Labit et al. | |
| 8,449,518 B2 | 5/2013 | Allison-Rogers | |
| 8,496,641 B2 | 7/2013 | Miyamoto et al. | |
| 8,545,474 B2 | 10/2013 | Schilpp et al. | |
| 8,562,580 B2 | 10/2013 | Van Gompel et al. | |
| 8,608,882 B2 | 12/2013 | Petersen | |
| 8,632,515 B2 | 1/2014 | Popp et al. | |
| 8,663,185 B2 | 3/2014 | Mizutani et al. | |
| 8,663,411 B2 | 3/2014 | McCabe | |
| 8,790,324 B2 | 7/2014 | Carney | |
| 8,814,844 B2 | 8/2014 | Sakaguchi | |
| 8,870,843 B2 | 10/2014 | Dougherty et al. | |
| RE45,256 E | 11/2014 | Vogt et al. | |
| 8,945,326 B2 | 2/2015 | Lavon et al. | |
| 9,161,861 B2 | 10/2015 | Sakaguchi et al. | |
| 9,226,861 B2 | 1/2016 | Lavon et al. | |
| 9,345,625 B2 | 5/2016 | Lavon et al. | |
| 9,370,224 B2 | 6/2016 | Dobrin et al. | |
| 9,439,818 B2 | 9/2016 | Sakaguchi et al. | |
| 9,539,153 B2 | 1/2017 | Popp et al. | |
| 9,681,997 B2 | 6/2017 | Sheehan | |
| 9,750,647 B2 | 9/2017 | Umebayashi | |
| 9,820,889 B2 | 11/2017 | Sina et al. | |
| 9,999,549 B2 | 6/2018 | Lavon et al. | |
| 10,070,996 B2 | 9/2018 | Umebayashi | |
| 10,085,896 B2 | 10/2018 | Lavon et al. | |
| 10,441,476 B2 | 10/2019 | Lavon et al. | |
| 10,470,939 B2 | 11/2019 | Sablone et al. | |
| 10,660,802 B2 | 5/2020 | Dollevoet et al. | |
| 10,780,002 B2 | 9/2020 | Swedberg et al. | |
| 11,554,053 B2 | 1/2023 | Sablone | |
| 11,571,340 B2 | 2/2023 | Lavon et al. | |
| 2002/0111596 A1 | 8/2002 | Fletcher et al. | |
| 2002/0123730 A1 | 9/2002 | Popp et al. | |
| 2002/0138056 A1 | 9/2002 | Kuen | |
| 2002/0138062 A1 | 9/2002 | Kuen | |
| 2003/0051805 A1 | 3/2003 | Mlinar | |
| 2004/0103972 A1 | 6/2004 | Tabor | |
| 2005/0059947 A1 | 3/2005 | Murguly | |
| 2007/0287980 A1 | 12/2007 | Kline et al. | |
| 2008/0210067 A1 | 9/2008 | Schlinz et al. | |
| 2011/0106042 A1 | 5/2011 | Sablone et al. | |
| 2015/0119219 A1 | 4/2015 | Sina | |
| 2020/0100952 A1 | 4/2020 | Sablone | |

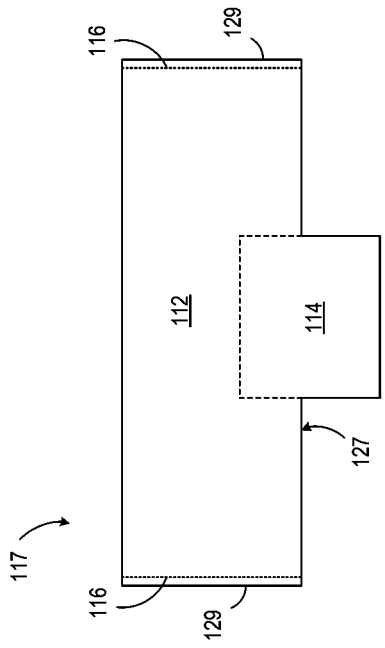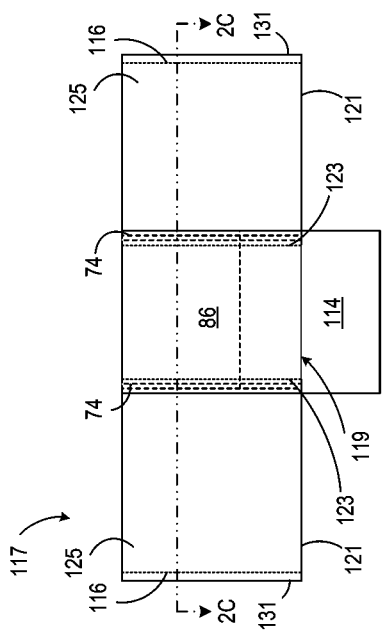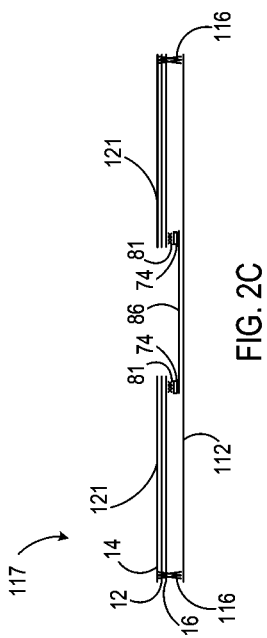

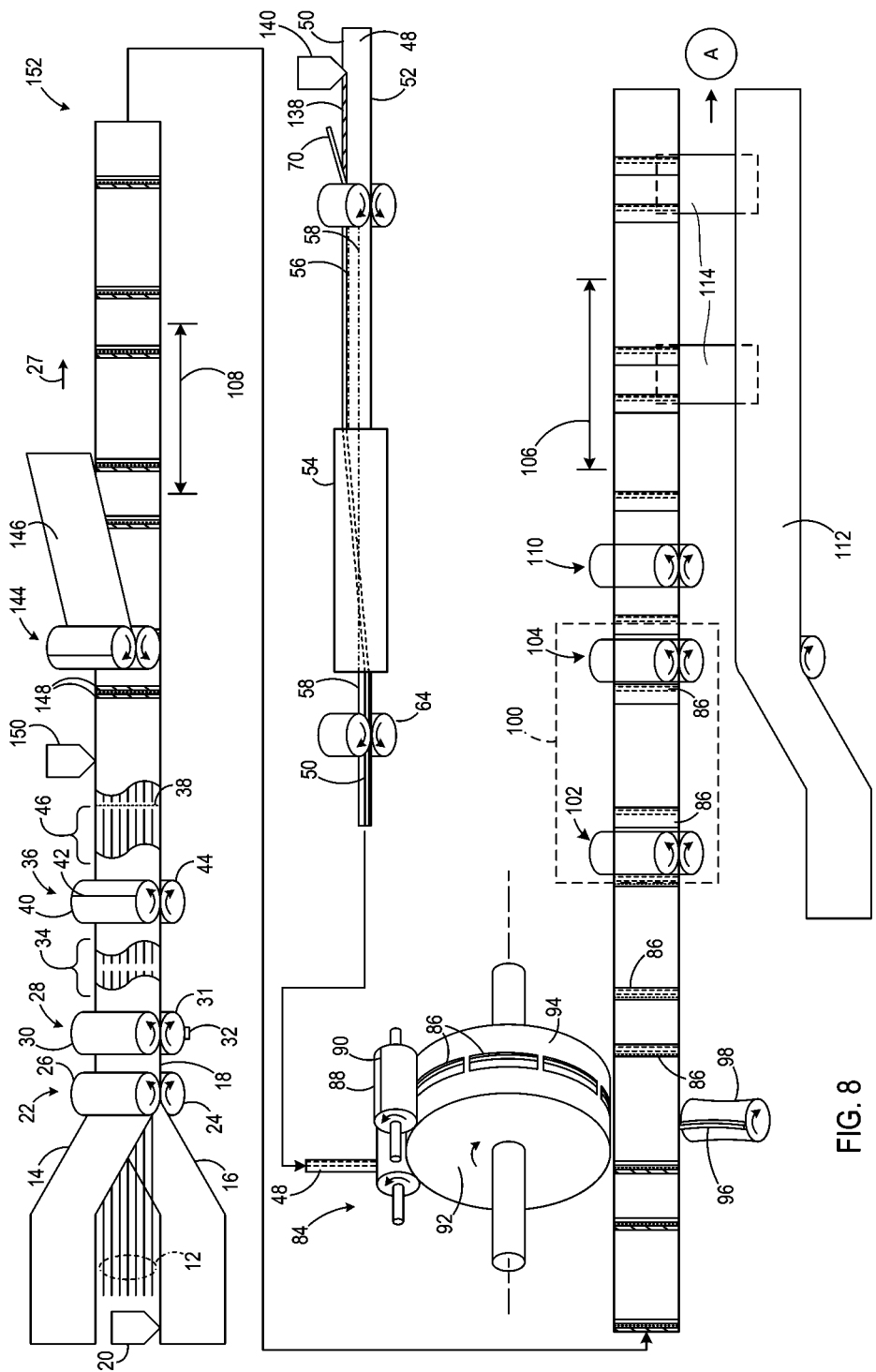

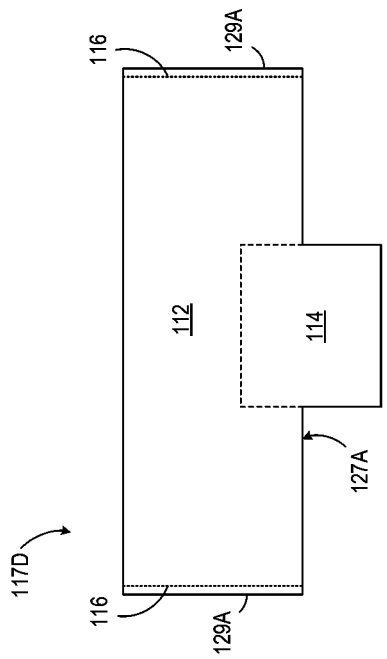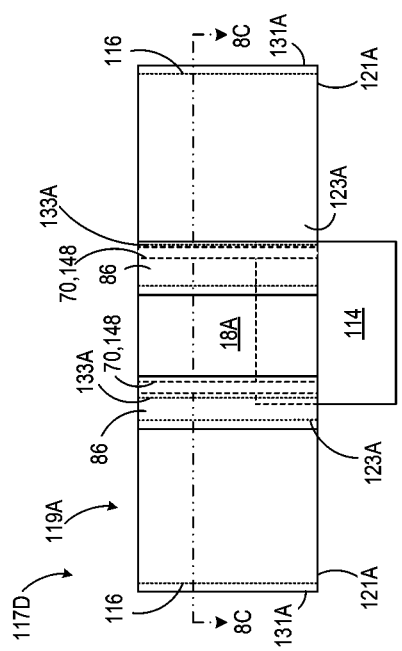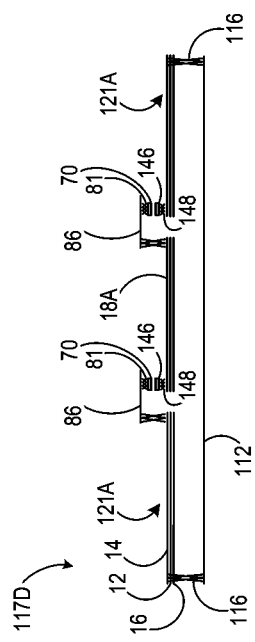

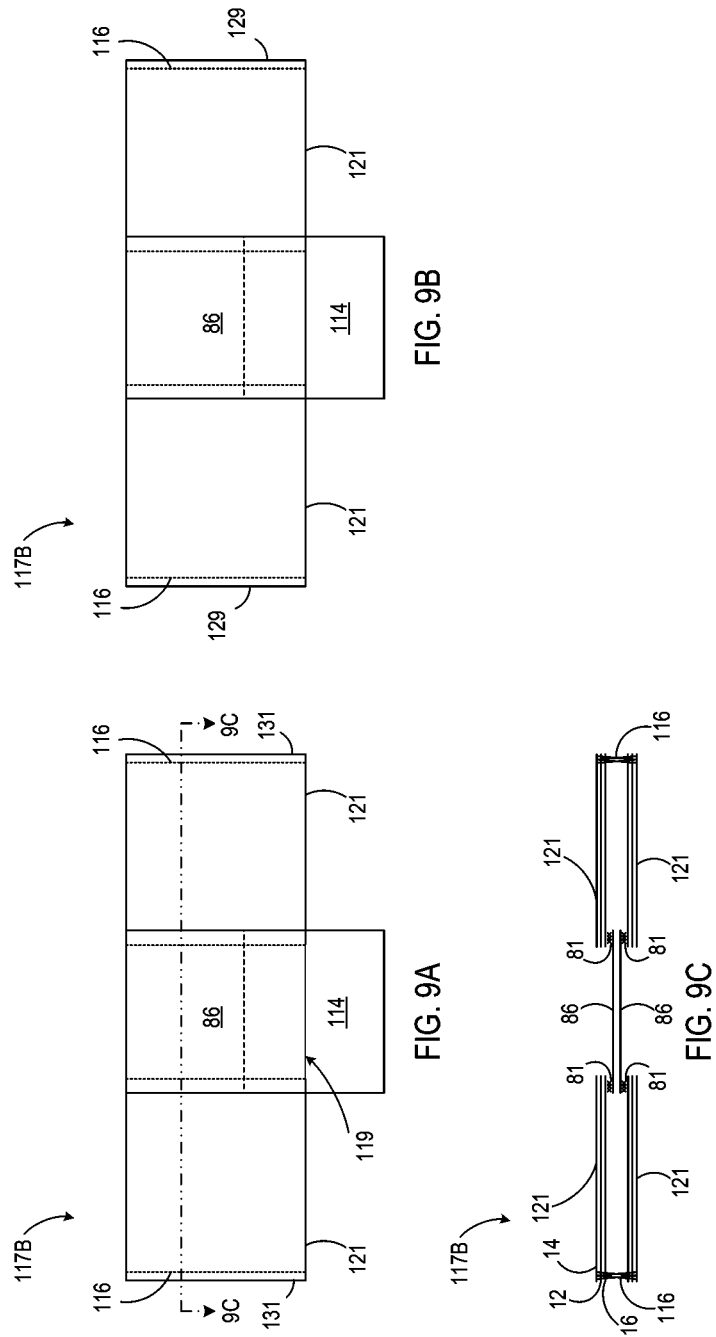

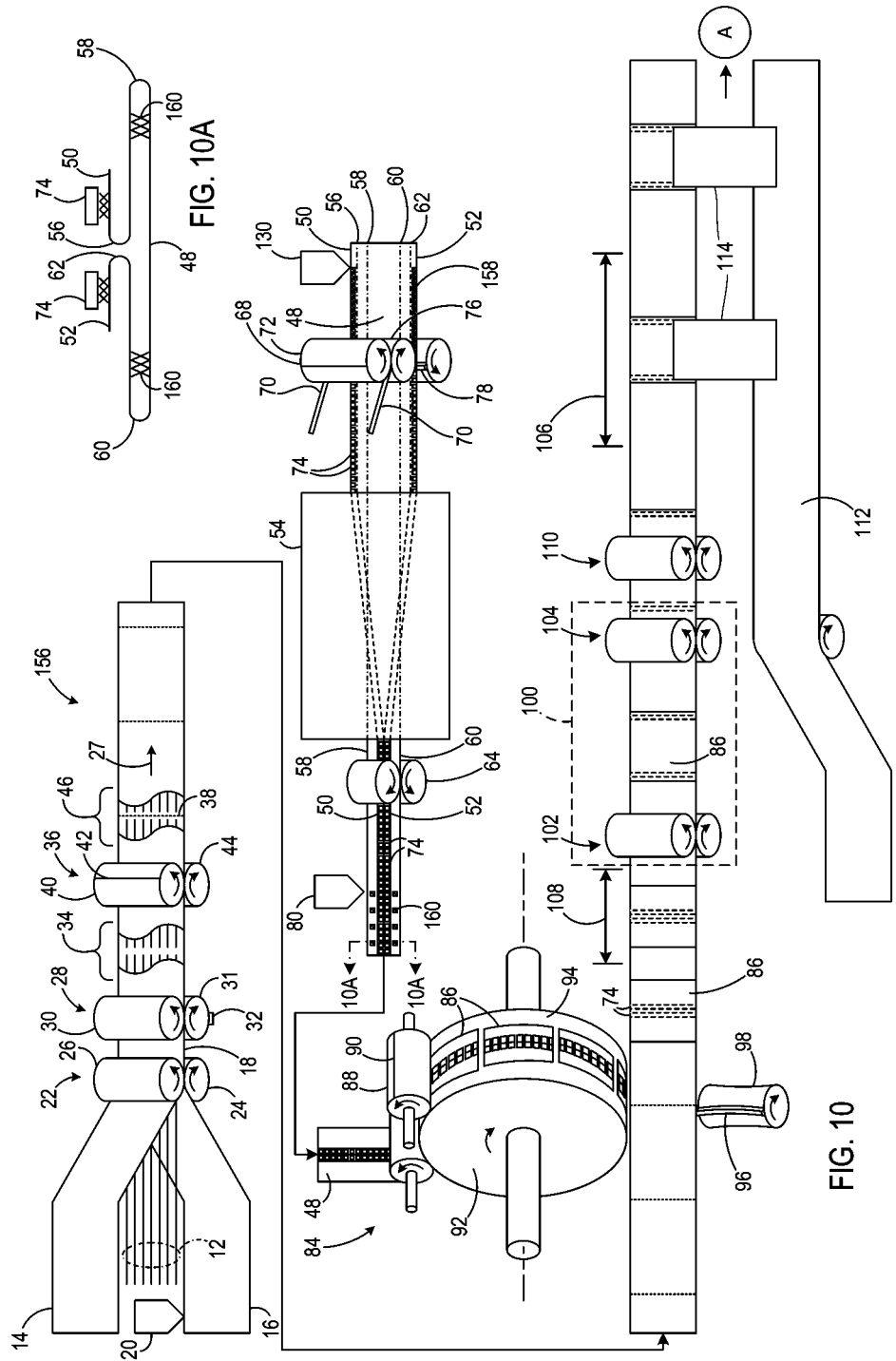

METHOD OF MAKING ELASTICIZED WAISTBAND FOR USE IN AN ABSORBENT GARMENT

CROSS-REFERENCE TO RELATED APPLICATION

This application is a 371 of international application number PCT/US2021/070077, filed on Jan. 25, 2021 which claims the benefit of U.S. Provisional Patent Application Ser. No. 62/966,112, filed Jan. 27, 2020, the disclosures of which are incorporated herein in its entirety.

BACKGROUND OF THE INVENTION

The present invention relates to a disposable absorbent sanitary product or garment and more specifically, to an apparatus and method for making an elasticized waistband material with elastic activation and deactivation zones and to refastenable disposable garments incorporating said elastic waistband material and method for making same.

Disposable products of the children's training pant type or of the adult incontinence type are typically provided with waist elastics on opposite sides of a garment blank, which, after folding together, are sealed or adhered together at formed side seams to entirely encircle the waist area of the finished garment. The construction of the side seams in this manner allows the product to be donned as one would don undergarment briefs or pants. That is, by inserting one's feet and legs through the leg openings of the training pant and pulling the pants up to the wearer's waist, the training pant can be worn without needing to fold and fasten ears of a disposable product constructed in a manner similar to that of baby diapers.

However, the construction of the side seams of the training pant in this manner prevents non-destructive separation of a portion of the waist area therefrom. For example, in the case where the training pant is to be removed from the wearer by opening the waist section and therefore the leg openings in order to remove the training pant without sliding it down the legs of the wearer, the waist section must be broken in a destructive manner. Once broken, the waist section of the training pant can no longer be used by itself to support the product around the waist of the wearer.

While the pre-formed waist section of the training pant provides convenience in donning the product, a need exists for a product offering the convenience of the typical training pant while providing a refastenable option allowing the waist of the training pant to be opened in a non-destructive manner. A further need exists for an apparatus and method that enables product changeover from one size of refastenable pant to another size of refastenable pant in an easy and efficient manner with minimal equipment change.

BRIEF STATEMENT OF THE INVENTION

Embodiments of the present invention relate to disposable garments and more specifically, to an apparatus and method for making disposable garments. More specifically, embodiments of the invention relate to a pant-type absorbent garment with one or more re-fastenable seams and an apparatus and method for making same.

In operation, a manufacturing assembly performs a perforation cut in a running waist web. About the perforation cut, the assembly attaches one or more pre-folded panels fitted with a portion of a re-fastenable joining means such as a gripping portion of a refastening tape or a hook portion of a hook-and-loop type fastening device. The running waist web may also be fitted with the corresponding loop tape configured to mate with the hook tape. The running waist web is subsequently separated at the perforation cut such that the separated running waist web remains joined together via the attached panel(s). Further processing includes folding the running waist web, which may be a front (or back) waist web, with an adjacent running back (or front) waist web and joining the front and back waist webs together to create side seams typical of disposable pant type garments that are permanently sealed via adhesive or mechanical, thermal, or ultrasonic bonds. The position of the break in the waist web created during the separation of the running waist web at the perforation cut is between the side seams in either the front or back waist portion. For the user's convenience, the break and corresponding panel are formed in the front waist portion. In some embodiments, the attached panel corresponding to the break may form no part of the side seam. In other embodiments the attached panel may extend into and be integrated with a side seam.

The disposable product of the present invention provides a benefit for allowing the garment to be put on in a manner similar to that of undergarment briefs while allowing the waist of the product to be opened and re-fastened in a non-destructive manner.

In accordance with one aspect of the invention, an apparatus for manufacturing an elasticized waistband for a refastenable absorbent garment includes a perforation cutter configured to form a series of perforation cuts in a continuous waist web comprising one or more elastic elements positioned between facing web layers. The apparatus also includes a panel applicator configured to cut a folded panel web comprising refastenable, fastener material into discrete panels and attach the discrete panels to the continuous waist web about the perforation cut. The apparatus further includes a breakage system configured to separate the continuous waist web at the perforation cuts and unfold the discrete panels.

In accordance with another aspect of the invention, a refastenable absorbent garment includes a first portion having opposing ends, the first portion comprising a central panel releasably attached to a pair of elasticized side panels by releasable fasteners, a second portion having opposing ends coupled to the opposing ends of the first portion, and an absorbent core having a first end coupled to the central panel of the first portion and a second end coupled to the second portion.

In accordance with another aspect of the invention, a method of manufacturing a refastenable absorbent garment includes applying a refastenable material to a continuous panel web, folding the continuous panel web to form a folded continuous panel web, cutting the folded continuous panel web into a plurality of discrete folded panels, and aligning the plurality of discrete folded panels with a series of perforations in a continuous elasticized waist web. The method also includes coupling the plurality of discrete folded patches to the continuous elastic web via the refastenable material, breaking the series of perforation cuts to form a first continuous waistband, coupling a plurality of absorbent cores between the first continuous waistband and a second continuous waistband, and cutting the first and second continuous waistbands to form at least one refastenable absorbent garment.

These and other advantages and features will be more readily understood from the following detailed description of preferred embodiments of the invention that is provided in connection with the accompanying drawings.

BRIEF DESCRIPTION OF THE DRAWINGS

The drawings illustrate embodiments presently contemplated for carrying out the invention.

In the drawings:

FIG. 2A is a schematic front view of a refastenable absorbent garment manufactured by the manufacturing assembly of FIG. 1 according to an embodiment of the invention.

FIG. 2B is a schematic back view of the refastenable absorbent garment manufactured by the manufacturing assembly of FIG. 1 according to an embodiment of the invention.

FIG. 2C is a cross-section view of the refastenable absorbent garment taken along line 2C-2C of FIG. 2A according to an embodiment of the invention.

FIG. 8 is a schematic view of a manufacturing assembly for producing a refastenable absorbent garment according to another embodiment of the invention.

FIG. 8A is a schematic front view of a refastenable absorbent garment manufactured by the manufacturing assembly of FIG. 8 according to an embodiment of the invention.

FIG. 8B is a schematic back view of a refastenable absorbent garment manufactured by the manufacturing assembly of FIG. 8 according to an embodiment of the invention.

FIG. 8C is a cross-section view of the refastenable absorbent garment taken along line 8C-8C of FIG. 8B according to an embodiment of the invention.

FIG. 9A is a schematic front view of the absorbent garment manufactured by the manufacturing assembly of FIG. 9 according to an embodiment of the invention.

FIG. 9B is a schematic back view of the absorbent garment manufactured by the manufacturing assembly of FIG. 9 according to an embodiment of the invention.

FIG. 9C is a cross-section view of the absorbent garment taken along line 9C-9C of FIG. 9B according to an embodiment of the invention.

FIG. 10 is a schematic view of a manufacturing assembly for producing a refastenable absorbent garment product according to another embodiment of the invention.

FIG. 10A is a cross-section view of a folded panel web taken along line 10A-10A of FIG. 10 according to an embodiment of the invention.

DETAILED DESCRIPTION

Although the disclosure hereof is detailed to enable those skilled in the art to practice the invention, the physical embodiments herein disclosed merely exemplify aspects of the invention which may be embodied in other specific structures. While the preferred embodiment has been described, the details may be changed without departing from the invention, which is defined by the claims.

Figure 1:
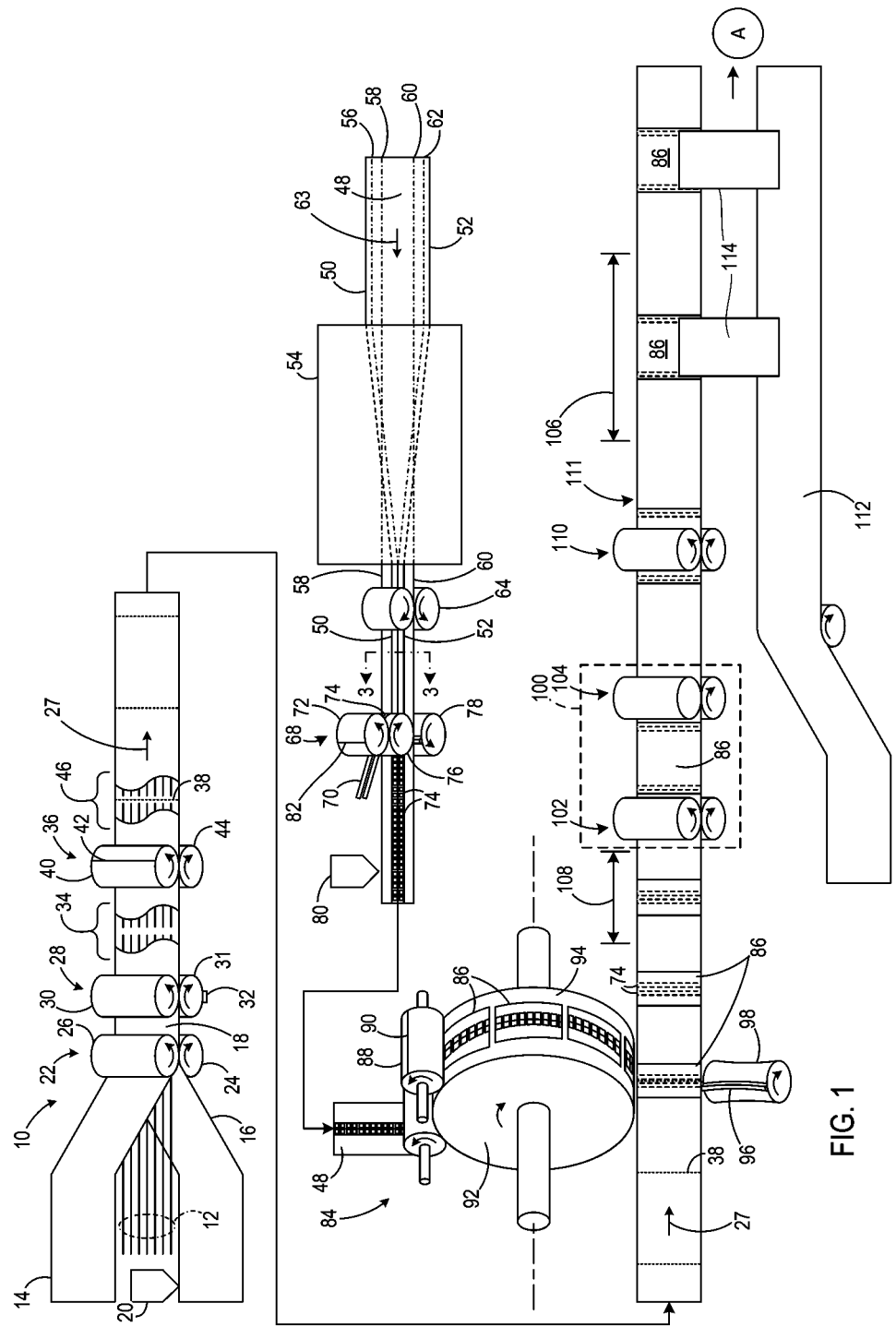
FIG. 1 is a schematic view of a manufacturing assembly for producing a refastenable absorbent garment according to an embodiment of the invention.

FIG. 1 illustrates a schematic view showing a manufacturing assembly line 10 configured to carry out a method for producing a disposable product according to an embodiment of the invention. One or more elastic elements 12 are inserted between and joined to a first web layer 14 and a second web layer 16 to form a continuous, elasticized waist web 18. While web layers 14, 16 are illustrated as separate components in FIG. 1, the web layers 14, 16 may be formed from a single, folded web in an alternate embodiment.

In one embodiment, an optional adhesive applicator 20 applies adhesive to the first and/or second webs 14, 16, which are pressed together with the elastic element(s) 12 therebetween via a joining assembly 22. In another embodiment, joining assembly 22 includes a thermal or ultrasonic bonding unit for joining the webs 14, 16 and elastic element(s) 12 together. For example, first web 14 and second web 16 may be materials capable of fusing to one another upon application of an applied energy that causes one or both of the webs 14, 16 to soften or melt and join together without the use of an intermediate layer of adhesive material such as glue. The facing pair of web layers 14, 16 may be the same type of material or different materials according to alternative embodiments. As non-limiting examples, first and second web layers 14, 16 may include nonwoven materials, woven materials, films, foams, and/or composites or laminates of any of these material types. The elastic element(s) 12 may be composed of any suitable elastic material including, for example, film or sheets, strands or ribbons of thermoplastic elastomers, natural or synthetic rubber, or elastic strands, as non-limiting examples. While elastic element(s) 12 are illustrated in the drawings as multiple, discrete elements and referred to throughout the remainder of the description as "elastic threads 12", it will be understood that any of the aforementioned types of elastic materials may be utilized in any of the disclosed embodiments. Each elastic thread 12 may be provided in the form of an individual elastomeric strand or be a manufactured multifilament product that includes many individual elastomeric filaments joined together, such as by a dry-spinning manufacturing process, to form a single, coalesced elastic thread 12. Elastic threads 12 may have any suitable cross-sectional shape that facilitates formation of an elastic composite structure having desired elasticity, visual aesthetic, and manufacturability. As non-limiting examples, elastic threads 12 may have a cross-sectional shape that is round, rectangular, square, or irregular as may be the case where each elastic thread 12 is a multifilament product.

Joining assembly 22 may be any known ultrasonic welding system in alternative embodiments, including, as non-limiting examples, a rotary ultrasonic welding system or a blade ultrasonic welding system. In the illustrated embodiment, joining assembly 22 includes a rotary anvil 24 and an ultrasonic rotary horn 26, which cooperate with each other to bond (i.e., fuse) the first web layer 14 to the second web layer 16. Alternative embodiments may include one or more fixed blade horns also known as sonotrodes. During the bonding process the elastic threads 12 are secured or anchored in position relative to the first and second web layers 14, 16 by the resulting pattern of bonds or welds, which are sized and spaced relative to the elastic threads 12 in a manner that maintains the elastic threads 12 in position relative to the web layers 14, 16. The bonds or welds may be arranged in pairs disposed on either side of a respective elastic thread 12, creating a pinch point that anchors the elastic thread in position relative to the facing web layers 14, 16, or may be positioned to partially or fully overlap the elastic thread 12 and fuse the elastic thread 12 to the facing web layers 14, 16, according to alternate embodiments.

The elastic threads 12 are attached to the web layers 14, 16 in a manner that defines elastic activation and deactivation zones in the continuous waist web 18. In embodiments that utilize adhesive applicator 20, the applicator 20 is configured to deposit the adhesive in an intermittent manner that creates regions where the elastic threads 12 are bonded to the web layers 14, 16 (referred to hereafter as activation zones) and regions where the elastic threads 12 are not bonded to the web layers 14, 16. In embodiments where adhesive applicator 20 is omitted and joining assembly 22 is a thermal or ultrasonic bonding unit, the bonding unit is configured to create a bonding pattern that results in alternating pattern of bonded, activation zones and non-bonded regions. The bonded regions and non-bonded regions are formed in an alternating pattern in the machine direction (MD) 27 as further described with respect to FIG. 1A.

Downstream of the joining assembly 22 in the machine direction (MD) 27 is a break assembly 28 comprising a pair of anvils 30, 31 configured to break the elastic threads 12 in a non-bonded region of the continuous waist web 18 when the tensioned elastic threads 12 pass therethrough without cutting or perforating the first or second web layers 14, 16. More specifically, anvil 31 includes a break bar 32 that extends outward from the face of the anvil 31. The pair of anvils 30, 31 are spaced apart from one another by a distance that defines a nip or gap through which the continuous waist web 18 passes through. At the point of rotation when the break bar 32 of anvil 31 is positioned facing anvil 30, the gap between the break bar 32 and anvil 30 is smaller than the overall thickness of the continuous waist web 18 and a pressure or pinching force is exerted on the elastic threads 12. The pressure imparts a stress on the elastic threads 12 that breaks the elastic threads 12 without cutting through the web layers 14, 16. In an alternative embodiment, the break bar 32 of anvil 31 may be replaced with a knife blade that creates a series of small cuts in the web layer 16 while also severing the elastic threads 12 at the break point. As illustrated in a cutaway portion 34 of the waist web 18 where the first sheet 14 is removed for clarity, since the severed ends of the elastic threads 12 are not bonded to the web layers 14, 16 at the break point, the ends of the elastic threads 12 retract away from the break point to create a deactivation zone where no elasticity is provided in the waist web 18. However, the elastic threads 12 are restrained from pulling too far away from the break due to their attachment to the first and second web layers 14, 16 in the adjacent activation zones.

Figure 1A:
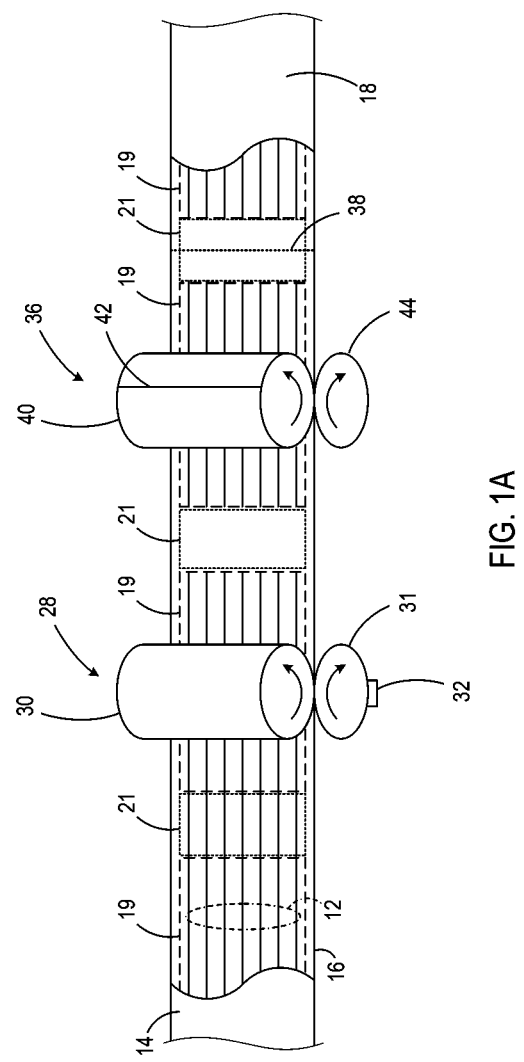
FIG. 1A is a detailed view of a portion of the waist web 18 shown in FIG. 1 during the deactivation and perforation process according to an embodiment of the invention.

FIG. 1A provides a detailed view of a portion of the waist web 18 during the deactivation and perforation process. A wider portion of the web layer 14 has been cutaway in the view shown in FIG. 1A to more clearly illustrate the relative locations of the activation and deactivation zones. The elastic threads 12 are bonded to the web layers 14, 16 via adhesive or mechanical, thermal, or ultrasonic bonds in activation zones 19 of the waist web 18. These activation zones 19 are formed in an alternating pattern with deactivation zones 21 in which the elastic threads 12 are not bonded to the web layers 14, 16.

Referring again to FIG. 1 with continued reference to FIG. 1A as appropriate, as the waist web 18 moves downstream from the break assembly 28, a perforation cutter 36 introduces a perforation 38 into the waist web 18 in the deactivation zone 21 that pierces both the first and the second web layers 14, 16. Perforation cutter 36 may include a rotary knife 40 with a blade 42 having a perforation cut pattern and a rotary anvil 44 against which the rotary knife 40 presses to make the perforation cut. In alternative embodiments, perforation cutter 34 may include a die instead of a knife blade or be a laser cutting device. As described below, the perforation cut 38 allows the waist web 18 to be broken as it is pulled apart in a later step of the process. As illustrated in another cutaway portion 46 of the waist web 18 as well as in FIG. 1A, the perforation 38 is positioned between broken elastic strands 12 in the deactivation zone 21. In an alternative embodiment, the perforation cutter 36 may create the deactivation zone 21 by cutting the stretched elastic threads 12 in addition to the first and the second web layers 14, 16. In this embodiment, the break assembly 28 may be eliminated.

In another part of the assembly line 10, a panel web 48 with first and second side edges 50, 52 is fed into a folding assembly 54 where the panel web 48 is folded along fold axes 56, 58, 60, 62 aligned with the machine direction (MD) 63 of the panel web 48. The panel web 48 may be composed of nonwoven materials, woven materials, films, foams, and/or composites or laminates of any of these material types. Folding assembly 54 folds the panel web 48 so that fold axes 56, 62 are positioned adjacently to one another in the central region of the panel web 48 while the distance between fold axes 58, 60 defines the folded width of the folded panel web 48. An optional tack bond unit 64 may be positioned downstream of the folding assembly 54 to place temporary bonds between folded layers of the panel web 48 to maintain the folds during further processing. The temporary bonds are later broken as described below. Tack bond unit 64 may form the bonds using any known means, including, for example with a bonding unit that applies ultrasonics, heat and/or pressure to mechanical couple material layers or with adhesive.

Figure 3:
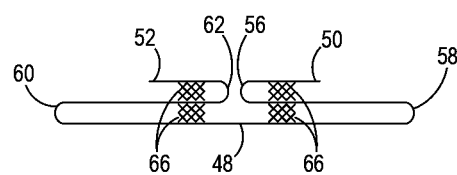
FIG. 3 is a cross-section view of a folded panel web taken along line 3-3 of FIG. 1 according to an embodiment of the invention.

Referring to FIG. 3, a cross-section view of folded panel web 48 is illustrated taken along line 3-3 of FIG. 1. The spacing between the overlapping layers of the panel web material are exaggerated for clarity in the illustration, but in practice, the layers are touching or very nearly touching as a result of being folded. As illustrated, a plurality of temporary bonds 66 may be put into the folded panel web 48 in order to hold the folds in place as the panel web 48 is handled by the process to attach individual panels to the waist web 18. In one embodiment, the temporary bonds 66 may be ultrasonically or thermally formed, although other methods of joining the layers together such as by adhesive are also contemplated herein. Temporary bonds 66 are not permanent bonds so that when the material of the folded panel web 48 is pulled apart, the temporary bonds 66 break without harm to the panel web material to which they are bonded. In this manner, the folded panel web 48 may be un-folded during a later step of the manufacturing process as described below.

Referring back to FIG. 1, the folded panel web 48 proceeds downstream to a tape applicator 68 configured to apply a portion 70 of a refastenable, hook-and-loop type fastener material 70 to the continuous panel web 48. In one embodiment, the applied portion of the fastener material is a hook portion 70. As used herein, "tape" refers to a length of webbing with or without adhesive having been pre-applied to the webbing. Accordingly, a tape may be self-adhesive or may be fastenable to a base substrate via an applied adhesive, sewing, or other fastening means known in the industry. In one embodiment, panel web 48 comprises a material capable of joining with the hook tape 70 to create a temporary bond without the need to have a corresponding loop tape portion. Accordingly, the material provides a substitute for loop tape. In an alternative embodiment, a loop tape may be applied to the continuous waist web 18 upstream of the tape applicator 68. In one embodiment, tape applicator 68 provides a cutting roll 72 positioned to cut a refastenable material or releasable fasteners 74, referred to hereafter as tape segments 74, from a continuous infeeding web of hook tape material 70 against a rotating anvil 76. The anvil 76, which is traveling at a speed equal to or very close to that of the infeeding tape web 70, carries the tape segments 74 to a point on its tangency where the folded panel web 48 traveling at a higher speed most nearly approaches, at which point the traveling folded panel web 48 is displaced slightly toward the anvil 76 by means of a protuberance 78 acting against the web 48. This movement causes web 48 to come into contact with the next available tape segment 74, which becomes attached to the higher-speed traveling web 48. Since the panel web material is capable of forming a connection with the hook tape 70, the cut segments 74 are placed hook-side toward the running folded panel web 48 so that when the protuberance 78 acts against the web 48, the hooks become engaged with and attached to the web material. An adhesive applicator 80 positioned adjacently to the running folded panel web 48 applies an adhesive 81 (FIG. 2C) to the tape segments 74 to later become adhered to the waist web 18.

Alternatively, tape applicator 68 may be a slip-and-cut applicator in which the tape web 70 is fed at a relatively low speed along the vacuum face of the rotating anvil 76, which is moving at a relatively higher surface speed and upon which the tape web 70 is allowed to "slip." A knife-edge 82, mounted on the rotating knife roll 72, cuts a segment 74 of tape from the tape web 70 against the anvil face. This knife-edge 82 is preferably moving at a surface velocity similar to that of the circumference of the anvil 76. Once cut, the tape tab segment 74 is held by vacuum drawn through holes on the face of the anvil 76 as it is carried at the anvil's speed downstream to the transfer point where the tape segment 74 is transferred to the traveling waist web 18.

The panel web 48 proceeds downstream to a cross direction (CD) panel applicator 84 that cuts discrete panels 86 from the panel web 48 and applies them to the running waist web 18. The panel applicator 84 includes a rotary knife or die rotary knife 88, with one or more cutting edges 90, that turns against and in coordination with a corresponding vacuum anvil 92. The infeeding folded panel web 48 is fed along the surface 94 of the anvil 92, which is rotating at a surface 94 velocity equal to or only somewhat greater than that of the panel web 48. As the panel web 48 passes the nip created between the knife-edges 90 and the anvil surface 94, individual discrete panels 86 are created but not significantly displaced upon the anvil surface 94. The discrete panels 86 continue downstream on the anvil surface 94, held securely by forces induced by a vacuum source directed to one or more holes provided for each segment in the anvil surface 94.

At a point downstream and along the surface 94 of the anvil where the panels 86 are adjacent to the running waist web 18 at a transfer position, the waist web 18 to which the discrete panels 86 are to be attached is brought into close proximity with the anvil 92. At the transfer position, the traveling waist web 18 is proceeding in a direction that is skew to the tangent of the rotational direction of the anvil 92 and the panels 86 are aligned with perforations 38. A device, which may be as simple as a protuberance 96 or multiple protuberances on a rotating cylinder 98, presses a target zone of the traveling waist web 18 against the exposed hook tape segments 74 of a discrete panel 86 as it is presented by the anvil surface 94. The protuberance 96 preferably has a surface velocity substantially identical to that of the traveling web and a curvature similar to that of the anvil surface 94.

The waist web 18 with attached panels 86 travels downstream toward a perforated cut breakage system 100. As shown, breakage system 100 includes a first pair of rollers 102 and a second pair of rollers 104 that are spaced apart in the machine direction (MD) 27. The surfaces of rollers 102 are travelling at a speed substantially identical to the speed of the running waist web 18 upstream of the rollers 102. That is, the speed of the first pair of rollers 102 is closely matched with the speed of the incoming waist web 18. The speed of the second pair of rollers 104 (i.e., the "post-break speed"), however, is faster than the speed the incoming waist web 18. Accordingly, the second pair of rollers 104 will induce a pulling force on the waist web 18 in the travelling direction or in the machine direction (MD) 27. The pulling force on the waist web 18 causes the perforation 38 to break, separating the waist web 18 at the perforation breaks. Once separated, the pulling force also causes any temporary bond 66 formed in the attached discrete panel 86 passing between the first and second pair of rollers 102, 104 to break, causing the panel 86 to unfold and straighten out. The unfolding of the panel 86 extends the length of the waist web 18 such that an unfolded distance 106 between adjacent panels 86 is greater than the folded distance 108 between adjacent panels 86, thereby forming a continuous front elasticized waistband 111. The unfolded distance 106 more closely matches the distance of the waist width of the end product of the refastenable absorbent garment than the folded distance 108.

An optional hook reinforcement tack bonder unit 110 may be used downstream of the perforated cut breakage system 100 to create temporary tack points or bonds between the layers of waist web 18, hook tape 70, and panel 86 to provide extra reinforcement to keep the layers together throughout the rest of the packaging process.

In a preferred embodiment, the waist web 18 is a front waist web configured to be donned in a forward-facing position on the wearer. A continuous back waist web or waistband 112 is fed into a position adjacent to the front waist web 18 at a speed substantially identical to the post-break speed. An absorbent core 114 is attached to and between the front waistband 111 in its unfolded state and the continuous back waistband 112 downstream of the perforated cut breakage system 100. In another embodiment, the front and back waistbands may be reversed such that the front waistband 111 is a back waistband and waistband 112 is a front waistband.

Figure 2:
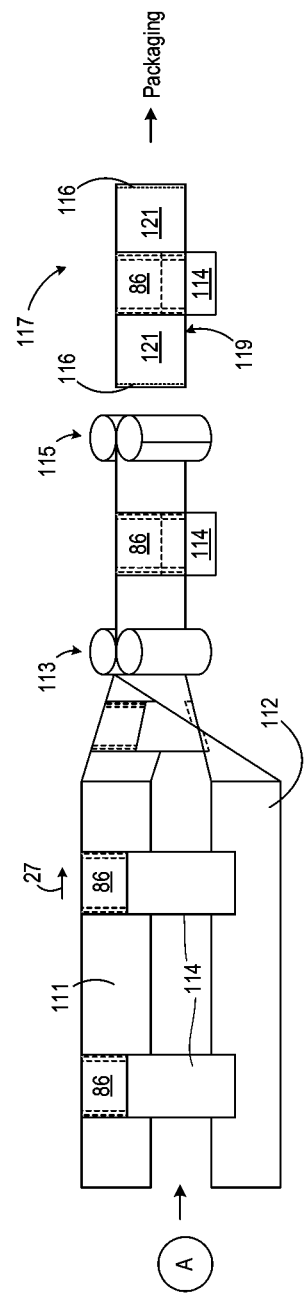
FIG. 2 is a schematic view of a continuation of the manufacturing assembly of FIG. 1 according to an embodiment of the invention.

As continued in FIG. 2, the joined webs 18, 112 are folded together such that the front waistband 111 and the back waistband 112 overlap. The overlapping waistbands 111, 112 are sealed by a bonding unit 113 to create side seams 116 in a manner known in the art, and are separated by a knife unit 115 to create individual refastenable absorbent garments 117. Thereafter, the individual refastenable garments 117 may move on to be further processed (e.g., folded into smaller units) and packaged.

As shown in FIG. 2 and in further detail in FIGS. 2A and 2B, the individual garments 117 include a first portion 119 having opposing ends located adjacent the side seams 116. The first portion 119 includes a central panel 86 that is releasably attached to a pair of elasticized side panels 121 constructed from the front waist web 18. As shown in FIG. 2A, the central panel 86 is positioned to overlap the inboard facing edges 123 of the elasticized side panels 121. Tape segments 74 positioned on the inward-facing surface of central panel 86 are releasably fastened to the outward-facing surface 125 of the elasticized side panels 121. Individual garments 117 also include a second portion 127 (FIG. 2B), that is constructed from the rear waist web 112, and has opposing ends 129 coupled to the opposing ends 131 of the first portion 119 via side seams 116. While the first portion 119 is described herein as forming the front panel of individual garments 117 and the second portion is described as forming the rear panel of individual garments 117, the configuration could be reversed in alternative embodiments to place the three-panel waistband at the rear of the garment 117. In yet other embodiments, the front and rear panels could be similarly constructed to each include a three-panel construction with a central panel 86 attached to a pair of elasticized side panels 121. The central panel 86 of each of the front and rear waistbands may be releasably attached to adjacent side panels 121 in one embodiment. Alternatively, releasable fasteners may be employed to couple the central panel 86 of one of the front or rear waistband to side panels 121 while the other central panel 86 is permanently coupled to its adjacent side panels 121. With respect to FIG. 2C and to the other cross-sectional views provided herein, it will be understood that the spacing between the stacked and/or overlapping layers of web material and other product components are exaggerated for clarity in the illustration, but in practice, the layers are touching or very nearly touching.

Figure 4:
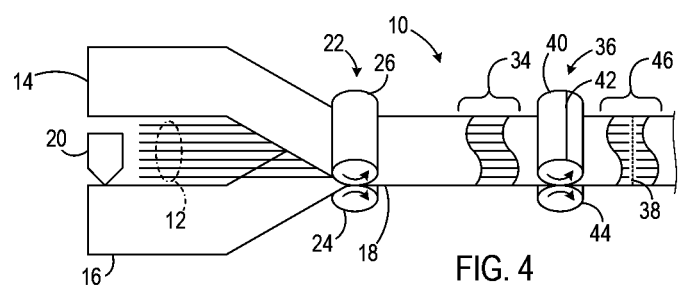
FIG. 4 is a schematic view of a portion of the manufacturing assembly of FIG. 1 according to another embodiment of the invention.

FIG. 4 shows a schematic view of a portion of the manufacturing assembly of FIG. 1 according to an alternate embodiment. As illustrated, assembly line 10 does not include a break assembly 28 as is found in the assembly line 10 of FIG. 1. Instead, prior to reaching the perforation cutter 36, the running waist web 18 has not had a deactivation zone created by a break assembly. Instead, the blade 42 of the perforation cutter 36 is designed such that the perforation cuts created in the first and second sheets 14, 16 are positioned to simultaneously cut each of the elastic strands 12. Once cut and broken, the elastic strands 12 separate to create the deactivation zone as shown in cutaway portion 46. While not shown in FIG. 4, the remainder of assembly line 10 downstream of cutaway portion 46 is the same as described relative to FIG. 1.

Figure 5:
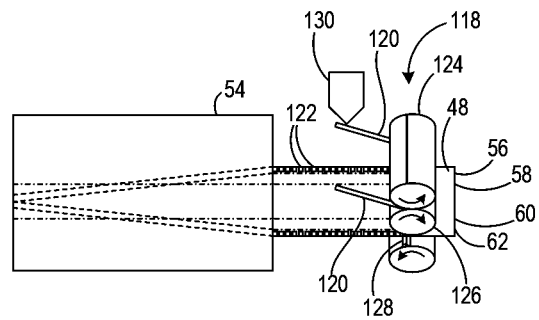
FIG. 5 is a schematic view of a portion of the manufacturing assembly of FIG. 1 according to another embodiment of the invention.

FIG. 5 shows a schematic view of a portion of the manufacturing assembly of FIG. 1 according to an alternate embodiment. As illustrated, a portion of the panel web 48 and folding assembly 54 are shown. In this embodiment, a tape applicator 118 configured to apply a loop tape 120 of a hook-and-loop type fastener to the panel web 48 configured to mate with the hook tape segments 74 attached downstream as illustrated in FIG. 1. Loop tape segments 122 might be used to provide a stronger bond than use of the panel web material alone. Tape applicator 118 includes a cutting roll 124, a rotating anvil 126, and a protuberance 128 similar to that of tape applicator 68 and function in a similar manner. An adhesive applicator 130 configured to apply adhesive 81A (FIG. 5A) to both loop tape webs 120 is provided. Loop tape segments 122 may be added upstream of the folding assembly 54 as illustrated or downstream of the folding assembly 54 in alternate embodiments depending on product design and process specifications.

Figure 5A:
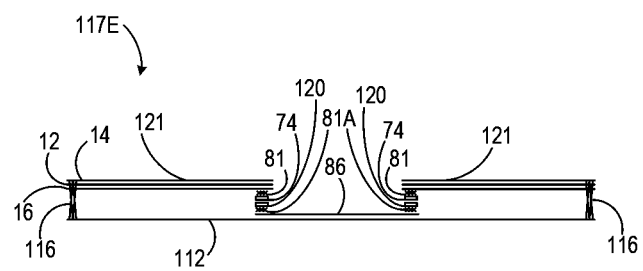
FIG. 5A is a cross-section view of a refastenable absorbent garment manufactured using the manufacturing assemblies of FIGS. 1 and 5 according to an embodiment of the invention.

FIG. 5A depicts a cross-sectional view of refastenable garment 117E manufactured according to the alternate embodiment described in FIG. 5. As shown, garment 117E includes all of the same components as described with respect to FIGS. 1, 2A, 2B, and 2C and further includes loop tape 120 that is coupled to the central panel 86 via adhesive 81A.

Figure 6:
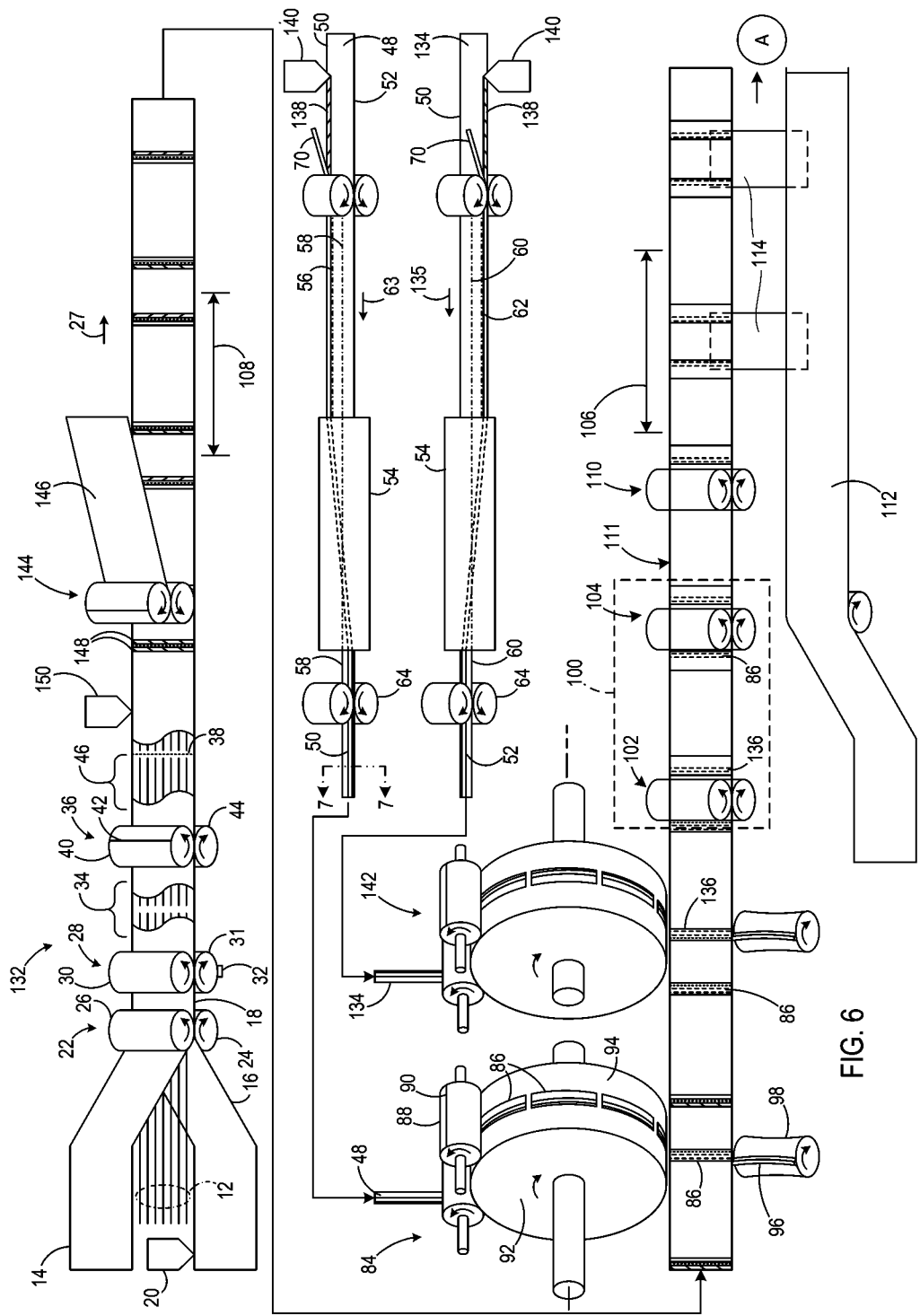
FIG. 6 is a schematic view of a manufacturing assembly for producing a refastenable absorbent garment according to another embodiment of the invention.

FIG. 6 illustrates a schematic view showing a manufacturing assembly line 132 configured to perform a method for producing a disposable product according to another embodiment of the invention. As shown, many of the components of assembly line 132 are similar to those of assembly line 10. For the components that function the same or similarly to those of assembly line 10 and are not described with respect to FIG. 6, see their descriptions as described above.

Figure 7:
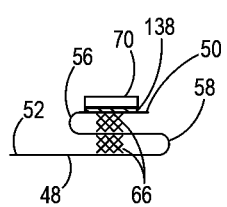
FIG. 7 is a cross-section view of a folded panel web taken along line 7-7 of FIG. 6 according to an embodiment of the invention.

While the assembly line 10 has been described as forming and making a single panel 86, assembly line 132 shows another embodiment for making and attaching two panels to the waist web 18 of each discrete refastenable absorbent garment. First panel web 48 and a second panel web 134, which may comprise any of the same materials described above for web 48, are processed to provide oppositely-facing panels 86, 136 attached to waist web 18. As illustrated, panel web 48 includes a single z-fold provided by folding assembly 54 rather than the pair of z-folds illustrated with respect to assembly line 10. FIG. 7 illustrates a cross-section view of folded panel web 48 is illustrated taken along line 7-7 of FIG. 6. Optionally, a non-hook side of the continuous hook tape 70 may be coupled to first panel web 48 using an adhesive 138 dispensed by an adhesive applicator 140. When used, adhesive 138 and adhesive applicator 140 may be applied as shown upstream of the folding assembly 54 or may be applied downstream of the folding assembly 54 and/or downstream of the tack bond unit 64 according to alternative embodiments.

Second panel web 134 is formed in a similar manner as that of first panel web 48 except that the folds therein are mirrored to those of first panel web 48 along the machine direction 135 of the second panel web 134. In this manner, the panel applicator 142 that applies the panels 136 to the waist web 18 applies the panel 136 with the hook tape 70 on the opposite side of the respective perforation 38 as that of the panels 86. The perforated cut breakage system 100 thus breaks two perforations 38 for each discrete disposable product, unfolding panels 86, 136 to extend the waist web 18 to match the distance 106.

FIG. 6 also illustrates an alternative and optional loop tape application in which an optional loop tape applicator 144 attaches loop tape 146 to an adhesive 148 applied to waist web 18 by an optional adhesive applicator 150 about the perforations 38 formed therein. The adhesive 148 may be applied in separate blocks on both sides of the perforations 38 or may be a continuous adhesive block applied to the waist web 18. The panel applicators 84, 142 applying panels 86, 136 to the waist web 18 apply the respective hook tapes 70 of the panels 86, 136 to respective loop segments of the loop tape 146. It is contemplated that the loop tape applicator 144 may be omitted in embodiments where the hook tape 70 will attach directly to the waist web 18.

Figure 6A:
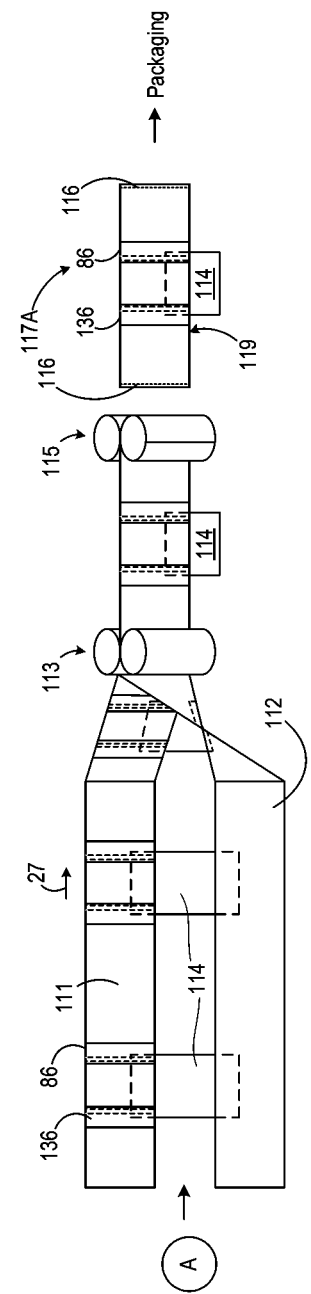
FIG. 6A is a schematic view of a continuation of the manufacturing assembly of FIG. 6 according to an embodiment of the invention.

After attachment of the absorbent cores 114 to the front and back waistbands 111, 112, final processing of the products 117A is performed in a similar manner as described above with respect to FIG. 2. FIG. 6A illustrates the continued manufacture in more detail. As continued in FIG. 6A, the joined waistbands 111, 112 are folded together such that the front and back waistbands 111, 112 overlap. The overlapping waistbands 111, 112 are sealed by a bonding unit 113 to create side seams 116 in a manner known in the art, and are separated by a knife unit 115 to create individual refastenable garments 117A. Thereafter, the individual refastenable garments 117A may move on to be further processed (e.g., folded into smaller units) and packaged.

Figure 6C:
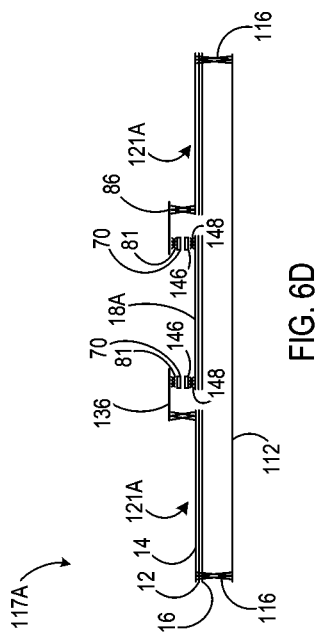
FIG. 6C is a schematic back view of a refastenable absorbent garment manufactured by the manufacturing assembly of FIG. 6 according to an embodiment of the invention.
Figure 6B:
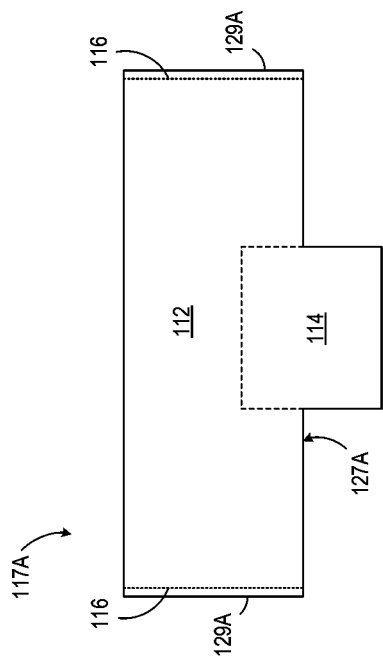
FIG. 6B is a schematic front view of a refastenable absorbent garment manufactured by the manufacturing assembly of FIG. 6 according to an embodiment of the invention.
Figure 6D:
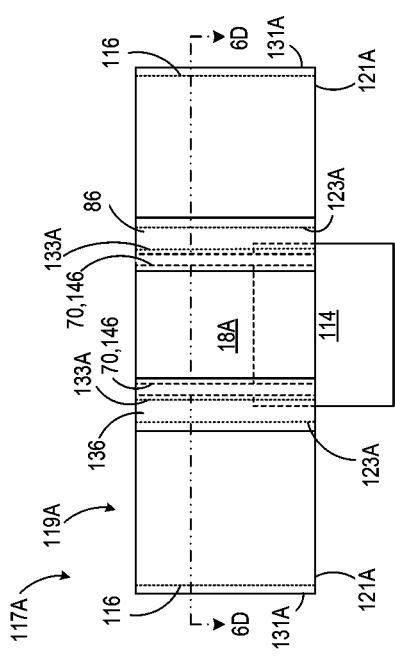
FIG. 6D is a cross-section view of the refastenable absorbent garment taken along line 6D-6D of FIG. 6B according to an embodiment of the invention.

As shown in FIG. 6A and in further detail in FIGS. 6B and 6C, the individual garments 117A include a first portion 119A having opposing ends located adjacent the side seams 116. The first portion 119A includes a central panel 18A constructed from the front waist web 18 that is releasably attached to a pair of oppositely-facing panels 86, 136 via hook tape segments 70 positioned on the outward-facing surfaces of panels 86, 136 and optional loop segments 146 coupled to the inward-facing surface of central panel 18A. These panels 86, 136 are coupled to elasticized side panels 121A constructed from the front waist web 18 via adhesive or ultrasonic bonds in alternative embodiments. As shown in FIG. 6B, the panels 86, 136 are positioned to overlap the inboard facing edges 123A of the elasticized side panels 121A and the outboard facing edges 133A of the central panel 18A. Individual garments 117A also include a second portion 125A (FIG. 6C), that is constructed from the rear waist web 112, and has opposing ends 129A coupled to the opposing ends 131A of the first portion 119A via side seams 116. While the first portion 119A is described herein as forming the front panel of individual garments 117A and the second portion 127A is described as forming the rear panel of individual garments 117A, the configuration could be reversed in alternative embodiments to place the five-panel waistband at the rear of the garment 117A. In yet other embodiments, the front and rear panels could be similarly constructed to each include a five-panel construction with a central panel 18A attached to a pair of oppositely-facing panels 86, 136, which in turn are attached to respective elasticized side panels 121A. The central panel 18A of each of the front and rear waistbands may be releasably attached to adjacent oppositely-facing panels 86, 136 in one embodiment. Alternatively, releasable fasteners may be employed to couple the central panel 18A of one of the front or rear waistband to oppositely-facing panels 86, 136 while the other central panel 18A is permanently coupled to its adjacent side panels 121A.

FIG. 8 illustrates a schematic view showing a manufacturing assembly line 152 configured to carry out a method for producing a disposable product according to another embodiment of the invention. Assembly line 152 comprises many of the same components as that of assembly line 132 of FIG. 6 and similar part numbering is used for like components as appropriate. However, in contrast to assembly line 132, assembly line 152 applies multiple panels 86 to waist web 18 having the same orientation. That is, panels 86 face the same direction and have their respective hook tapes 70 attached to the same side of their respective perforations 38. In this manner, the number of components of the assembly line 152 is less than that of the assembly line 132 of FIG. 6 for a simpler system. However, the user experience of separating the panel 86 from the finished product waist web 18 created by the assembly line 152 differs from that of the product produced by the assembly line 132.

After the absorbent cores 114 are attached to the front and back waist webs 18, 112, final processing of the disposable products 117D (FIG. 8A) is performed in a similar manner as described above with respect to FIG. 6A. Namely, the joined waistbands 111, 112 are folded together such that the front and back webs 112 overlap, the overlapping waistbands 111, 112 are sealed by a bonding unit 113 (FIG. 6A) to create side seams 116 in a manner known in the art, and are separated by a knife unit 115 (FIG. 6A) to create individual refastenable garments 117D. Thereafter, the individual refastenable garments 117D may move on to be further processed (e.g., folded into smaller units) and packaged.

As shown in FIGS. 8A and 8B, the individual garments 117D include a first portion 119A having opposing ends located adjacent the side seams 116. The first portion 119A includes a central panel 18A constructed from the front waist web 18 that is releasably attached to a pair of panels 86 via hook tape segments 70 positioned on the outward-facing surfaces of panels 86 and optional loop segments 146 coupled to the inward-facing surface of central panel 18A. These panels 86 are coupled to elasticized side panels 121A constructed from the front waist web 18 via adhesive or ultrasonic bonds in alternative embodiments. As shown in FIG. 8B, the panels 86 are positioned to overlap the inboard facing edges 123A of the elasticized side panels 121A and the outboard facing edges 133A of the central panel 18A. Individual garments 117D also include a second portion 125A (FIG. 8B), that is constructed from the rear waist web 112, and has opposing ends 129A coupled to the opposing ends 131A of the first portion 119A via side seams 116. While the first portion 119A is described herein as forming the front panel of individual garments 117D and the second portion 127A is described as forming the rear panel of individual garments 117D, the configuration could be reversed in alternative embodiments to place the five-panel waistband at the rear of the garment 117D. In yet other embodiments, the front and rear panels could be similarly constructed to each include a five-panel construction with a central panel 18A attached to a pair of panels 86, which in turn are attached to respective elasticized side panels 121A. The central panel 18A of each of the front and rear waistbands may be releasably attached to adjacent panels 86 in one embodiment. Alternatively, releasable fasteners may be employed to couple the central panel 18A of one of the front or rear waistband to panels 86 while the other central panel 18A is permanently coupled to its adjacent side panels 121A.

Figure 9:
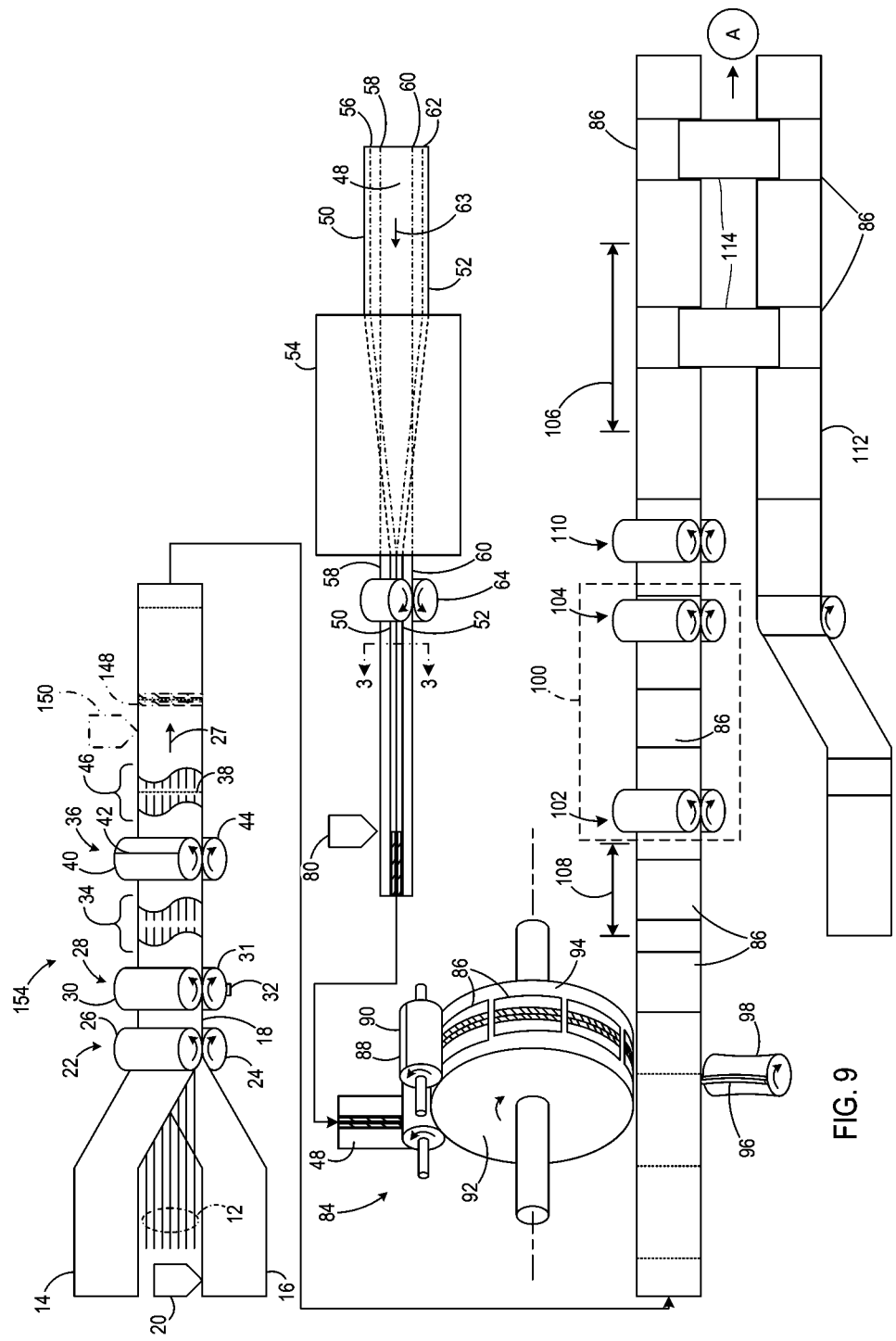
FIG. 9 is a schematic view of a manufacturing assembly for producing an absorbent garment according to another embodiment of the invention.

FIG. 9 illustrates a schematic view showing a manufacturing assembly line 154 configured to carry out a method for producing an absorbent garment 117B (FIGS. 9A, 9B) according to another embodiment of the invention. As shown, many of the components of assembly line 154 are similar to those of assembly line 10. For the components that function the same or similarly to those of assembly line 10 and are not described with respect to FIG. 1, see their descriptions as described above.

While the assembly line 10 has been described as forming and making a single panel 86 attached to the waist web 18 via a re-fastenable means such as by a hook-and-loop type fastener means, in the alternative assembly line 154 illustrated in FIG. 9, the single panels 86 are attached to the waist web 18 in a more permanent manner. Adhesive applicator 80 is configured to apply adhesive directly to the panel web 48 in a series of discrete applications or as a running application. Adhesive applicator 80 may apply the adhesive downstream of the tack bond unit 64 as shown or may be positioned to apply the adhesive upstream of the tack bond unit 64, upstream of the folding assembly 54, downstream of the rotary knife 88, or another location prior to attachment of the single panels 86 to the waist web 18. In another embodiment, assembly line 154 may alternatively, or in addition, include an adhesive applicator such as adhesive applicator 150 described with respect to FIG. 6 for applying adhesive 148 to the waist web 18 in lieu of or additionally to the adhesive applied by the adhesive applicator 80. A removal or other separation of all or a portion of a panel 86 from the waist web 18 to which it is adhesively attached in this embodiment results in a destructive separation that can no longer be used by itself to support the product around the waist of the wearer.

FIG. 9 also shows an embodiment usable in any of the other embodiments herein where the back waist web 112 is formed in a similar manner as the front waist web 18 in having a permanent or re-fastenable panel applied thereto. Accordingly, both the front and back waist webs 18, 112 include areas of elastic deactivation.

As shown in FIGS. 9A, 9B and 9C, the front and back sides of individual garments 117B include a central panel 86 coupled to adjacent elasticized side panels 121 via a bond 81. The bond 81 can be formed with adhesive or via ultrasonic bonding according to alternative embodiments. Side edges 129, 131 of the side panels 121 are bonded together via a side seam bond 116 in a similar manner as described with respect to the other embodiments above.

FIG. 10 illustrates a schematic view showing a manufacturing assembly line 156 configured to carry out a method 156 for producing a refastenable absorbent garment according to another embodiment of the invention. As shown, many of the components of assembly line 156 are similar to those of assembly line 10 shown in FIG. 1 or 5. For the components that function the same or similarly to those of assembly line 10 and are not described with respect to FIG. 10, see their descriptions as described above.

As shown in FIG. 10, the tape applicator 68 is positioned upstream of the folding assembly 54 so that the cut segments 74 are attached prior to folding the panel web 48. In embodiments where the hook tape material 70 is provided without adhesive on its non-hook side, an optional adhesive applicator 130 may be configured to apply patches of adhesive 158 to the panel web 48 upstream of the tape applicator 68. The cut segments 74 are attached to the adhesive patches 158 with their hook-side toward the rotating anvil 76 so that the non-hook side is adhesively attached to the panel web 48. When later joined with the waist web 18, the discrete panels 86 are coupled to the waist web 18 via the hooks of the cut segments 74. If desired, an optional temporary bonding unit 80 may create temporary tack bonds 160 to assist with placement of the discrete panels 86 on the waist web 18. Bonding unit 80 may be an adhesive applicator or thermal, pressure, or ultrasonic bonding unit according to alternate embodiments. These temporary bonds 160 are broken during the breaking of the perforations 38 by the breakage system 100. After attaching absorbent cores 114, further processing continues in the manner discussed with respect to FIG. 2 to create individual garments 117.

Figure 11:
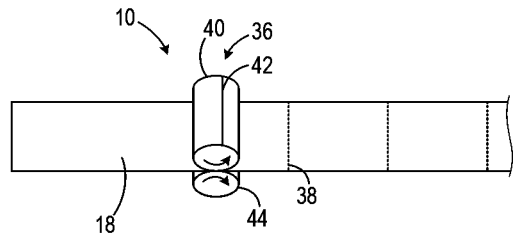
FIG. 11 is a schematic view of a portion of the manufacturing assembly of FIG. 1 according to another embodiment of the invention.

FIG. 11 shows a schematic view of a portion of the manufacturing assembly of FIG. 1 according to an alternate embodiment. In contrast to the elasticized waist web formed from pairs of sheets 14, 16 together with elastic threads 12, the waist web 18 illustrated in FIG. 11 is formed from a stretch film material that includes one or more layers of stretchable material. Accordingly, the perforation cutter 36 may still be used to create the perforation 38, but without the separate sheets 14, 16 or elastic threads 12, the adhesive applicator 20, the joining assembly 22, and the break assembly 28 are not necessary and can be eliminated.

Figure 12:
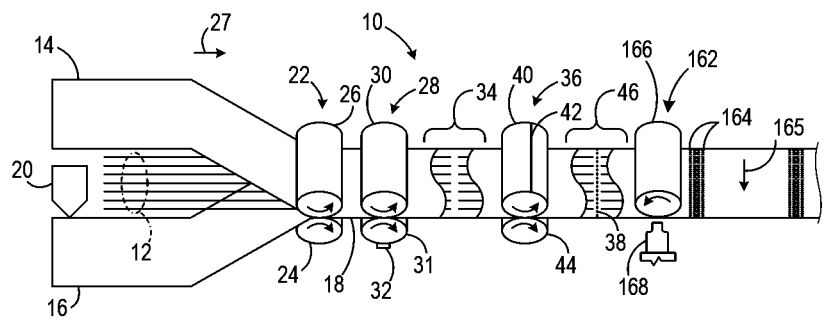
FIG. 12 is a schematic view of a portion of the manufacturing assembly of FIG. 1 according to another embodiment of the invention.
Figure 13:
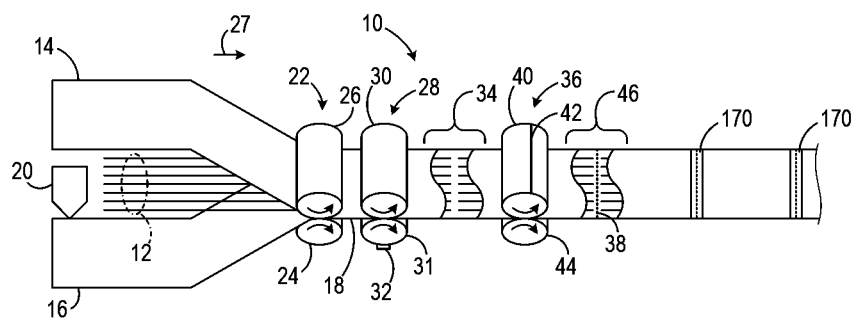
FIG. 13 is a schematic view of a portion of the manufacturing assembly of FIG. 1 according to another embodiment of the invention.

FIGS. 12 and 13 show schematic views of a portion of the manufacturing assembly of FIG. 1 according to alternate embodiments. In each of the embodiments shown in FIGS. 12 and 13, the area on either side of the perforations 38 are reinforced to strengthen the bonding of the first sheet 14 to the second sheet 16 and minimize separation of the sheets 14, 16 from each other in the areas of elastic deactivation. As shown in FIG. 12, a bonding apparatus 162 is positioned downstream of the perforation cutter 36. The bonding apparatus 162 bonds the first sheet 14 to the second sheet 16 at bonding sites 164 to create adjacent lines of bonds that are oriented in a cross-machine direction (CD) 165 and couple together the facing sheets 12, 14 on either side of the perforations 38. Bonding apparatus 162 may be any known thermal, pressure, or ultrasonic welding system in alternative embodiments, including, as non-limiting examples, a rotary ultrasonic welding system or a blade ultrasonic welding system. In the illustrated embodiment, bonding apparatus 162 includes a rotary anvil 166 and an ultrasonic fixed blade horn 168, also known as a sonotrode, which cooperate with each other to bond (i.e., fuse) the first sheet 14 to the second sheet 16. Alternative embodiments may include multiple fixed blade horns or one or more rotary horns.

The ultrasonic emission or energy from bonding apparatus 162 is concentrated at specific bond points where frictional heat fuses the layers of web together without the need for consumable adhesives. While bonding apparatus 162 is described herein as an ultrasonic bonding assembly that ultrasonically fuses layers of web together, it is contemplated that the techniques described herein may be extended to any other known welding or bonding techniques that fuse together two or more material layers without the use of adhesive, including sonic, thermal, or pressure bonding techniques and various other forms of welding known in the industry.

As shown in FIG. 13, a bonding zone 170 is created on opposing sides of each perforation 38 by either the break assembly 28 or the perforation cutter 36. In one embodiment, the break assembly 28 is constructed to serve a dual function of severing the elastic threads 12 and bonding the first sheet 14 to the second sheet 16 to create the bonding zone 170. In another embodiment, the perforation cutter 36 is a dual function roller that includes a knife component that creates perforation cuts 28 and a bonding apparatus that creates the bonding zone 170. The bonding zone 170 may be created by known welding or bonding techniques that fuse together two or more material layers without the use of adhesive, including sonic, thermal, or pressure bonding techniques and various other forms of welding known in the industry.

The above disclosure is intended to provide a general description of the basic parts of disposable absorbent products such as pant-style diapers and the like as they are known in the art. The description is not intended to be limiting. Any and all of various known elements, features and processes of known pant-style diapers, and the like can be incorporated in the disposable garment of the present invention as desired or needed for commercial manufacture, or for particular use benefits.

Therefore, according to one embodiment of the invention, an apparatus for manufacturing an elasticized waistband for a refastenable absorbent garment includes a perforation cutter configured to form a series of perforation cuts in a continuous waist web comprising one or more elastic elements positioned between facing web layers. The apparatus also includes a panel applicator configured to cut a folded panel web comprising refastenable, fastener material into discrete panels and attach the discrete panels to the continuous waist web about the perforation cut. The apparatus further includes a breakage system configured to separate the continuous waist web at the perforation cuts and unfold the discrete panels.

According to another embodiment of the invention, a refastenable absorbent garment includes a first portion having opposing ends, the first portion comprising a central panel releasably attached to a pair of elasticized side panels by releasable fasteners, a second portion having opposing ends coupled to the opposing ends of the first portion, and an absorbent core having a first end coupled to the central panel of the first portion and a second end coupled to the second portion.

According to yet another embodiment of the invention, a method of manufacturing a refastenable absorbent garment includes applying a refastenable material to a continuous panel web, folding the continuous panel web to form a folded continuous panel web, cutting the folded continuous panel web into a plurality of discrete folded panels, and aligning the plurality of discrete folded panels with a series of perforations in a continuous elasticized waist web. The method also includes coupling the plurality of discrete folded patches to the continuous elastic web via the refastenable material, breaking the series of perforation cuts to form a first continuous waistband, coupling a plurality of absorbent cores between the first continuous waistband and a second continuous waistband, and cutting the first and second continuous waistbands to form at least one refastenable absorbent garment.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description but is only limited by the scope of the appended claims.

What is claimed is:

1. A method of manufacturing a refastenable absorbent garment (117) comprising:
    applying a refastenable material (74) to a continuous panel web (48);
    folding the continuous panel web (48) to form a folded continuous panel web (48);
    cutting the folded continuous panel web (48) into a plurality of discrete folded panels (86);
    aligning the plurality of discrete folded panels (86) with a series of perforations in a continuous elasticized waist web (18);
    coupling the plurality of discrete folded panels (86) to the continuous elasticized waist web (18) via the refastenable material (74);
    breaking the series of perforation cuts to form a first continuous waistband (111); thereby unfolding the folded panels (86);
    coupling a plurality of absorbent cores (114) between the first continuous waistband (111) and a second continuous waistband (112) by attaching the absorbent cores (114) to the unfolded panels (86); and
    cutting the first and second continuous waistbands (111, 112) to form at least one refastenable absorbent garment (117).

2. The method of claim 1 further comprising:
    applying a first portion of the refastenable material (74) to a first edge of the continuous panel web (48); and
    applying a second portion of the refastenable material (74) to a second edge of the continuous panel web (48).

3. The method of claim 1 further comprising breaking the series of perforations by stretching the continuous elasticized waist web (18).

4. The method of claim 1 further comprising temporarily bonding the plurality of discrete folded panels (86) to the continuous elasticized waist web (18).

* * * * *